United States Patent [19]
Nolan et al.

[11] 4,164,151
[45] Aug. 14, 1979

[54] RANDOM VIBRATION GENERATOR

[75] Inventors: Douglas C. Nolan, Syracuse; Joseph T. Hubbard, Skaneateles, both of N.Y.

[73] Assignee: Mechanical Technology, Inc., Latham, N.Y.

[21] Appl. No.: 925,225

[22] Filed: Jul. 17, 1978

[51] Int. Cl.² .............................................. B06B 1/10
[52] U.S. Cl. ..................................................... 73/663
[58] Field of Search ................. 73/662, 663, 665, 666, 73/667, 668, 672

[56] References Cited

U.S. PATENT DOCUMENTS

| 3,037,378 | 6/1962 | Hill ............................................ 73/667 |
| 3,369,393 | 2/1968 | Farmer ..................................... 73/663 |

*Primary Examiner*—Stephen A. Kreitman
*Attorney, Agent, or Firm*—Joseph V. Claeys; John M. Neary

[57] ABSTRACT

A random vibration generator includes a hollow tabletop for supporting equipment to be subjected to vibration, and a sinusoidal reaction-type vibration machine connected to the tabletop to produce a sinusoidal vibration of adjustable frequency and amplitude. The hollow tabletop is horizontally divided into four sections, each containing a number of projectiles such as heavy balls which roll and bounce about within the compartments in the tabletop, impacting with the floor and ceiling of the compartment and with each other in a random fashion to produce random shocks over a wide band of frequency and amplitude, and subject the equipment to every possible vibration failure mode that might occur in nature.

10 Claims, 3 Drawing Figures

RANDOM VIBRATION GENERATOR

BACKGROUND OF THE INVENTION

This invention relates to test equipment for subjecting test objects to random vibration over a wide band of frequency and amplitude.

It has become a common practice in many industries, particularly the electronics industry, to test their products for conditions to which they may be subjected in the course of their use by the customer, in order to anticipate problems that may arise and design the product to better withstand these conditions. One such condition is vibration.

When it is known what kind of vibration the product will encounter in its normal operation, it may be tested at this particular vibration. However, most products are subjected to a wide band of frequency, amplitude and G-level vibration and shock loads in the course of a normal life, and it has been observed that equipment, subject to a large number of low intensity shocks, do not, in general, display the same types of failure as equipment subject to a few relatively large amplitude shocks. Therefore, to discover weaknesses in the support and damping structures that can become manifest at some unpredictable point in the enormous spectrum of vibration which a product might be subjected to in normal use, it has increasingly been regarded as necessary to test the product over a wide band vibration input, generally 0–2000 Hz, over a wide range of amplitude and G-level.

It has been necessary in the past to test equipment on electrodynamic vibration exciters which are the only means heretofore known for producing the range of amplitude and frequency needed for a thorough test of vibration tolerance. However, the electrodynamic vibration exciters are very expensive to purchase and maintain, and the art has long benn in search of a low cost random vibration generator for a tester which provides a full and adjustable range of amplitude and frequency of vibration shocks.

SUMMARY OF THE INVENTION

Accordingly, it is an object of this invention to provide a vibration table for subjecting test objects to random vibrations over a wide band of vibration input. It is another object of this invention to produce a vibration table for subjecting test objects to random vibrations of adjustable amplitude, frequency and G-level. It is another object of the invention to provide a low cost vibration test table of durable and reliable mechanical design.

The vibration tabletop is formed with several internal compartments, each containing a number of loose projectiles which roll and bounce about, impacting with the compartment floor and ceiling, and with each other, to produce random shocks over a broad spectrum of frequency, amplitude and G-level. The power spectral density of the vibrations produced by this invention can be adjusted to some extent by varying the operating parameters of the machine, such as the frequency and amplitude of the sinusoidal generator; the number, size, shape and composition of the projectiles; the stiffness of the mounting devices; and the mass of the tabletop and test load.

DESCRIPTION OF THE DRAWINGS

These and other objects of the invention will become more apparent upon a reading of the following description of the preferred embodiment in connection with the following drawings, wherein.

DESCRIPTION OF THE PREFERRED EMBODIMENT

Figure 1:
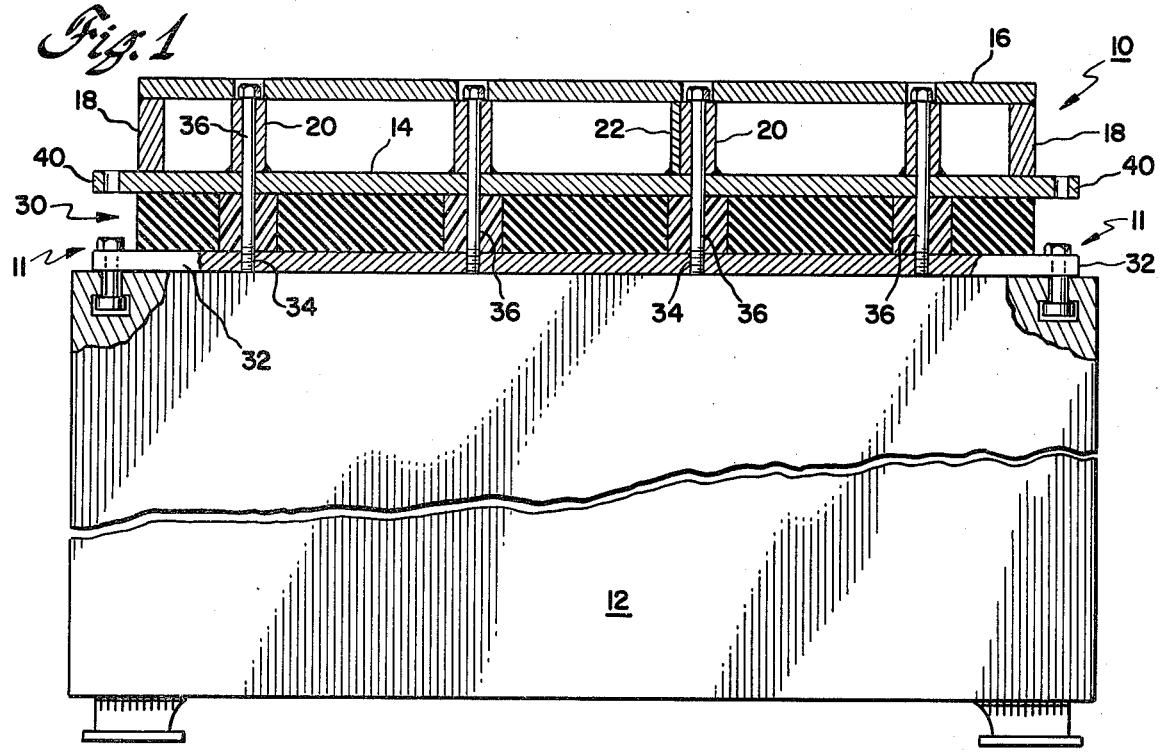
FIG. 1 is an elevation of a vibration table showing a random vibration generator in accordance with this invention mounted thereon.

Turning now to the drawings wherein like reference characters designate identical or corresponding parts, and more particularly to FIG. 1 thereof, a random vibration generator according to this invention is shown at 10 mounted by ears and bolts 11 on the top of a reaction-type vibration machine 12 which produces sinusoidal wave forms of displacement. Although the random vibration generator 10 may be utilized with many different vibration testing machines, a model BRVP-24 sold by LAB Corporation of Skaneateles, New York, is a representative example of such a machine. The operating frequency of the machine is adjustable, and the amplitude of the vibration excursions can be modified by changing the load or adjusting the degree of eccentricity of the vibration generator weights. The acceleration of the tabletop produced by this machine is approximately 3.2 g's, which is sufficient for the purposes of this invention. The vibration excursion amplitude is between 0.05 and 0.07 inches, although greater excursions are permissible provided the acceleration remains above 1.0 g's.

Figure 2:
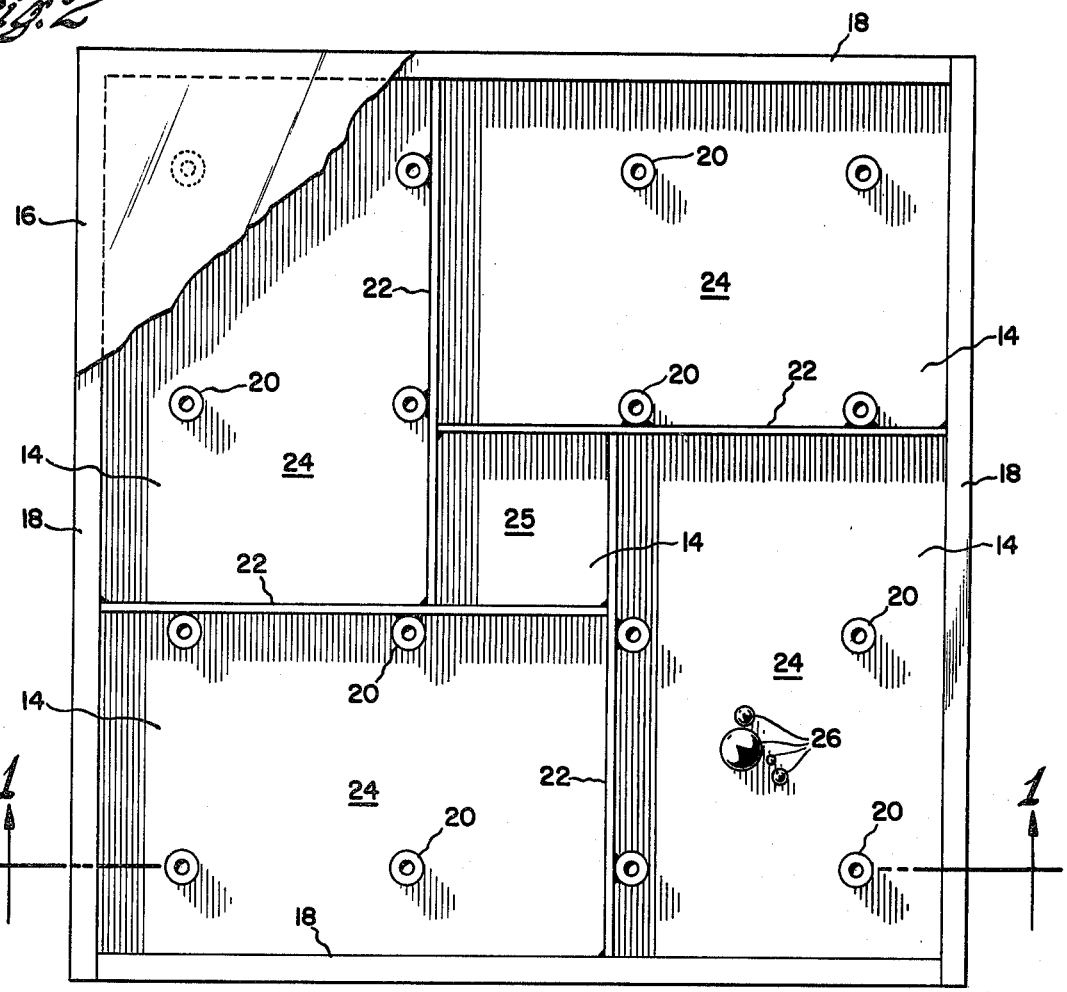
FIG. 2 is a plan view, partly in section, of the random vibration generator shown in FIG. 1.

The random vibration generator 10 includes a floor 14 and a ceiling 16 separated by four upright peripheral walls 18. A plurality of tubular bosses 20 are welded at regularly spaced locations to the floor 14 and vertically support the ceiling 16. Four compartment partitions 22, best shown in FIG. 2, are welded to the bosses 20 and to the floor 14 and walls 18 to enclose the hollow interior space defined by the walls, ceiling and floor into four rectangular compartments 24 and one central square compartment 25.

A plurality of projectiles 26, such as steel balls of various sizes and number, are located within the compartments 24 for generating the random vibrations. When the vertical component of the sinusoidal vibration produced by the vibration machine 12 exceeds 1 g acceleration, the projectiles 26 captured in the compartments of the tabletop will commence to bounce and strike the ceiling and floor plates of the vibration generator causing these plates to vibrate at a wide range of frequencies.

The vibration generator 10 includes an insulated base 30 to insulate the vibration machine 12 from the shocks produced in the generator 10. The insulated base 30 includes a baseplate 32 having a series of threaded holes 34 formed therein aligned with the axes of the hollow bosses 20. The baseplate 32 is connected to the top assembly by bolts 36 which extend down through the center of the tubular bosses 20 and are threaded into the holes 34. A layer of insulation and hard spacers are compressed by the bolts 36 between the floor plate 14 and the baseplate 34 to absorb shocks transmitted downwardly toward the vibration machine 12 and to provide a thermal barrier between the test object and vibration table 12 when vibration tests are performed in combination with temperature cycling tests.

In the embodiment shown, the floor 14 and ceiling 16 of the tabletop are each formed of a 24 inch square plate of 6061T6 aluminum plate ½ inch thick. The peripheral walls 18 are ⅜ inch thick, two inches high, and formed of the same material as the top and floor plate. The partitions 22 are primarily for the purpose of maintaining the distribution of the balls across the surface area of the vibration generator and therefore are not subjected to as much stress, so they may be much thinner—¼ inch in this embodiment. Each compartment includes six 1.50 inch diameter balls, four 1.25 inch diameter balls, ten 1.0 inch diameter balls and fifteen 0.75 inch diameter balls.

Conveniently, the walls and bosses are first welded to the floor plate 14, then the balls are placed within the compartments, and the ceiling 16 is welded in place. Aluminum plate is used because of its light weight, durability and low cost.

A greater Grms energy level would be facilitated by the use of steel floor and ceiling plates. Steel plates being less damped than aluminum would increase the energy producing and transmitting capability of the machine. They may also shift the frequency range depending on the plate thickness used. Very thin sections of steel for instance, in attempting to keep the weight the same, would probably lower the frequency band.

Figure 3:
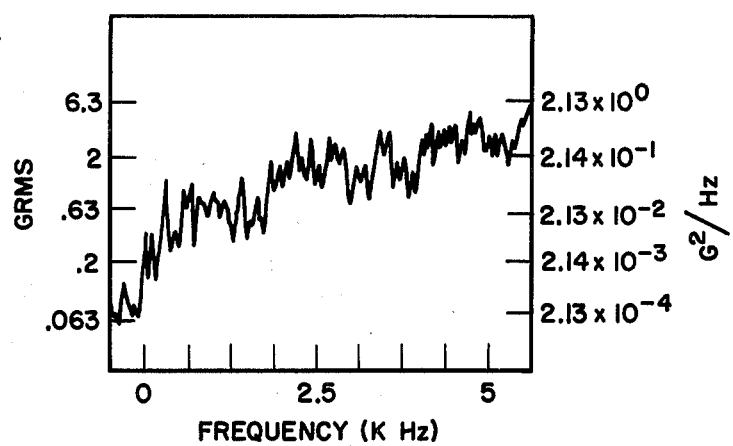
FIG. 3 is a typical spectrograph showing the distribution of energy of the vibrations in the response spectrum produced by the embodiment of the invention shown in FIGS. 1 and 2.

The spectrogram shown in FIG. 3 shows the vibration output with the vibration machine running at 30% amplitude with a 10 lb. load and 2200 RPM running speed. As frequency increases for a given amplitude of vibration of the sinusoidal shaker, the acceleration of the sine table increases as a square function, therefore propelling the balls on the table at a greater force and thus producing more energy as the balls strike the walls of the enclosed top. Thus, increasing the frequency of the vibration table without decreasing the amplitude of the vibration excursions will generally increase the Grms level; decreasing the amplitude of the vibration table will decrease the Grms energy level. The frequency range of the vibrations produced by the invention is primarily a function of the response spectrum of the vibration table itself and the load response spectrum. The response may also change due to the connection of load to the tabletop. The size, shape, materials used, and method of fabrication (connection of joints) affect the response of the table structure as do the size, mass, number and type of components within the test load. Since balls of different size are used, they provide a variety of forces, thus contributing to the random or complex nature of the vibrations produced in the top plate. The large number of different size balls in each compartment imparts a wide range of impacts to the load. The energy of impact varies in proportion to the mass and the square of the velocity of the projectiles, causing a broad spectrum of frequencies to be exited in the top. By varying the number and type of a particular ball in each compartment, it is possible to vary the distribution of energy in the response spectrum of the table by emphasizing certain frequencies over others, and thereby cause a shift of energy to some extent to the desired frequency band.

Steel spherical balls were selected for this preferred embodiment because they cause little wear on the aluminum walls, ceiling and floor of the tabletop, and because their mass and hardness produced a satisfactory vibration spectrum. However, other shapes, sizes and material of projectile can be used, such as steel clad lead balls, eccentric masses, and tethered and spring loaded masses. In addition, amplification of shocks is possible by use of a spring loaded plate in the ceiling or floor of a compartment which would absorb energy of the ball in one direction and return it to the ball in the form of momentum in the other direction to impart a shock of greater intensity than would be otherwise possible.

The small clearance between the balls and the underside of the ceiling plate 16 provides a greater power output at a higher frequency than would otherwise be possible without the use of separate means of driving the projectiles. This clearance is greater for the smaller projectiles, but if desired may be kept small by using hollow balls or balls which have been drilled or otherwise machined to remove interior mass while retaining substantially the same external dimensions. Hollow balls, however, will generally be more damped than solid balls and will produce lower G-level shocks.

The optimum clearance will depend on the frequency and amplitude of the vibrations produced by the sinusoidal shaker table 12; the elasticity and hardness of the floor 14 and ceiling 16; the mass, hardness and elasticity of the balls 26; and numerous other factors, mentioned previously. In general, however, the clearance should not exceed the height of the largest projectile and preferably should be less than one-half the diameter of the largest projectile. For vibration generators using very small projectiles, however, wherein the frequency range is much higher and the Grms energy level is much lower, a clearance larger in proportion to the projectile size (but not exceeding one inch) is feasible. This clearance can be adjusted by inserting shims having tubular sleeves which fit over the bosses and interior walls. The sleeves and walls would be held down by the ceiling panel to minimize damping and keep the frequency range high.

The vibration generator 10 is shown disposed horizontally, between the sinusoidal vibration shaker table. However, the vibration generator could also be fastened to the top of the test load by ears 40, in which case there would be no need for the insulating base 30. In addition, the vibration generator 10 could be disposed vertically and attached by ears 40 to one or more sides of the test load if there is a substantial horizontal component of vibration exerted by the particular vibration table used. In the vertical orientation, it would be advisable to use more and heavier dividing partitions 14 to separate the balls.

The random vibration generator disclosed herein is a simple and reliable mechanical device that can easily be modified to adjust the spectral energy density and provide the vibration spectrum from the direction or directions which the test load would ordinarily encounter in its intended use. This invention thus affords a degree of design flexibility not found in random vibration generators of much higher price, and does so with a simplicity, economy and elegance of design that assures dependable operation over a long and trouble-free life.

Obviously, numerous modifications to the disclosed embodiment of the invention are possible and are contemplated as falling within the spirit and scope of the invention defined by the following claims, wherein:

We claim:

1. A random vibration generator for generating and transmitting to a test object, shocks over a wide band of frequency, amplitude and G-level, on a vibration machine, comprising:
   a housing including floor, ceiling and walls defining a hollow enclosed chamber;
   means for connecting together a test object and said housing;
   partition means within said housing extending between said floor and ceiling, for dividing said chamber into a plurality of separate compartments;
   a plurality of loose projectiles within said chamber and distributed among said compartments; and
   whereby when said vibration machine oscillates with a component transverse to said floor and said ceiling, it will cause said projectiles to bounce about within said compartments, impacting with said floor and ceiling, to generate shocks over a wide bandwidth of frequency, amplitude and G-level, which shocks are transmitted to the test object.

2. The vibration generator defined in claim 1, wherein the clearance between said floor and said ceiling is less than twice the height of the largest projectile.

3. The vibration generator defined in claim 1, wherein the height of the largest projectile is at least twice the height of the smallest projectile.

4. The vibration generator defined in claim 1, further comprising a baseplate connected to said housing and compressing therebetween a layer of insulation.

5. The vibration generator defined in claim 1, further comprising a series of bosses attached to said floor plate and to at least three of which each of said partitions is attached, said bosses being shorter than twice the diameter of the largest of said projectiles.

6. The vibration generator defined in claim 5, wherein said bosses extend completely between said floor and said ceiling and each includes a longitudinal passage for receiving a bolt;
   a baseplate vertically spaced below said housing;
   a layer of insulation compressed between said baseplate and said floor plate;
   a plurality of bolts extending through said boss passages and said floor plate and urging said baseplate and said ceiling toward each other to hold said ceiling plate snug against said bosses and compress said insulation between said baseplate and said floor plate.

7. A method for generating and transmitting, to a test object, shocks over a wide band of frequency, amplitude and G-level, comprising:
   mounting the test object to a hollow housing having a narrow depth in relation to its length and width, and containing a plurality of projectiles of various masses and sizes;
   shaking said housing and the test object at accelerations having a component parallel to the narrow depth of said housing greater than 1 g, and with a stroke long enough to cause said projectiles to strike the large area walls of said housing; and
   whereby said projectiles will be caused by said shaking to impact against said large area walls of said housing, to generate shocks over a broad spectrum of frequencies, amplitudes and G-level which are transmitted through said housing to the test object.

8. The method defined in claim 7, wherein said housing is disposed horizontally and shaking is exerted by a vertical vibration machine to which the housing and test object are connected.

9. The method defined in claim 8, wherein the frequency and amplitude of said shaking is high enough that said projectiles strike both top and bottom walls and are accelerated after each impact with the bottom wall and also the top wall of the housing.

10. The method defined in claim 9, wherein the dimension of the narrow depth of the housing between said top and bottom walls is less than twice the diameter of the largest of said projectiles.

* * * * *